(12) United States Patent
Crutcher

(10) Patent No.: US 8,918,487 B2
(45) Date of Patent: *Dec. 23, 2014

(54) APPLET EMBEDDED CROSS-PLATFORM CACHING

(71) Applicant: Craig Crutcher, Seattle, WA (US)

(72) Inventor: Craig Crutcher, Seattle, WA (US)

(73) Assignee: Novell, Inc., Provo, UT (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/687,787

(22) Filed: Nov. 28, 2012

(65) Prior Publication Data

US 2013/0091247 A1    Apr. 11, 2013

Related U.S. Application Data

(63) Continuation of application No. 11/183,738, filed on Jul. 19, 2005, now Pat. No. 8,332,489, which is a continuation of application No. 09/484,455, filed on Jan. 18, 2000, now Pat. No. 6,983,315.

(51) Int. Cl.
*G06F 13/00* (2006.01)
*H04L 29/08* (2006.01)

(52) U.S. Cl.
CPC .......... *H04L 67/02* (2013.01); *H04L 67/2842* (2013.01); *H04L 67/34* (2013.01); *H04L 67/28* (2013.01)
USPC .......................................... 709/220; 709/232

(58) Field of Classification Search
CPC ..... H04L 67/02; H04L 67/28; H04L 67/2842; H04L 67/34
USPC ................... 709/220, 230, 232, 201
See application file for complete search history.

(56) References Cited

U.S. PATENT DOCUMENTS 5,487,167 A    1/1996    Dinallo et al.
5,581,764 A    12/1996    Fitzgerald et al.
(Continued)

FOREIGN PATENT DOCUMENTS

WO    WO-9746955 A1    12/1997
WO    WO-0153940 A2    7/2001
WO    WO-0154375 A2    7/2001

OTHER PUBLICATIONS

Marimba, [Online]. Retrieved from the Internet: Press Release, "Marimba, Inc. Granted U.S. Patent," (Jul. 9, 1999) "Introducing the Castanet Product Family" (copyright 1966-2000) "Castanet Infrastructure Suite" (copyright 2000.

(Continued)

*Primary Examiner* — Kenneth Coulter
(74) *Attorney, Agent, or Firm* — Schwegman Lundberg & Woessner, P.A.

(57) ABSTRACT

An applet is used to deliver a persistent caching mechanism. An initial package of the applet incorporates a lightweight caching mechanism into its root set of classes. The remainder of the applet are divided into functional modules that can be subsequently downloaded as seeded. The initial applet and caching mechanism is packaged and signed in a package using tools and procedures native to each platform; and each functional module is packaged and signed in a generic, platform-independent fashion for verification and loading by any of the various platform-dependent initial applet packages. In this way, the same functional module portions of the applet (which may comprise the bulk of the applet) are cached and loaded in a platform-independent manner without requiring or relying on any caching mechanism built into a platform such as a web browser or other applet execution environment.

20 Claims, 5 Drawing Sheets

(56) References Cited

U.S. PATENT DOCUMENTS

| | | | |
|---|---|---|---|
| 5,583,983 A | 12/1996 | Schmitter | |
| 5,630,131 A | 5/1997 | Palevich et al. | |
| 5,634,058 A | 5/1997 | Allen et al. | |
| 5,668,998 A | 9/1997 | Mason et al. | |
| 5,708,796 A | 1/1998 | Ozden et al. | |
| 5,712,976 A | 1/1998 | Falcon, Jr. et al. | |
| 5,721,824 A | 2/1998 | Taylor | |
| 5,742,768 A | 4/1998 | Gennaro et al. | |
| 5,745,380 A | 4/1998 | Sandvoss et al. | |
| 5,754,774 A | 5/1998 | Bittinger et al. | |
| 5,761,477 A | 6/1998 | Wahbe et al. | |
| 5,764,235 A | 6/1998 | Hunt et al. | |
| 5,765,164 A | 6/1998 | Prasad et al. | |
| 5,787,284 A | 7/1998 | Blainey et al. | |
| 5,802,292 A | 9/1998 | Mogul | |
| 5,805,829 A | 9/1998 | Cohen et al. | |
| 5,812,864 A | 9/1998 | McCoy et al. | |
| 5,835,749 A | 11/1998 | Cobb | |
| 5,859,971 A | 1/1999 | Bittinger et al. | |
| 5,867,661 A | 2/1999 | Bittinger et al. | |
| 5,878,213 A | 3/1999 | Bittinger et al. | |
| 5,878,223 A | 3/1999 | Becker et al. | |
| 5,878,417 A | 3/1999 | Baldwin et al. | |
| 5,892,905 A | 4/1999 | Brandt et al. | |
| 5,909,569 A | 6/1999 | Housel, III et al. | |
| 5,919,247 A | 7/1999 | Van Hoff et al. | |
| 5,933,644 A | 8/1999 | Wallace | |
| 5,950,010 A | 9/1999 | Hesse et al. | |
| 5,956,733 A | 9/1999 | Nakano et al. | |
| 5,958,013 A | 9/1999 | King et al. | |
| 5,960,204 A | 9/1999 | Yinger et al. | |
| 5,964,836 A | 10/1999 | Rowe et al. | |
| 5,966,702 A | 10/1999 | Fresko et al. | |
| 5,974,129 A | 10/1999 | Bodnar | |
| 5,978,477 A | 11/1999 | Hull et al. | |
| 5,978,788 A | 11/1999 | Castelli et al. | |
| 5,978,791 A | 11/1999 | Farber et al. | |
| 6,003,087 A | 12/1999 | Housel, III et al. | |
| 6,008,811 A | 12/1999 | McMillan | |
| 6,009,410 A | 12/1999 | LeMole et al. | |
| 6,014,702 A | 1/2000 | King et al. | |
| 6,052,525 A | 4/2000 | Carlson et al. | |
| 6,065,024 A | 5/2000 | Renshaw | |
| 6,069,627 A | 5/2000 | Conrad et al. | |
| 6,073,129 A | 6/2000 | Levine et al. | |
| 6,074,434 A | 6/2000 | Cole et al. | |
| 6,088,524 A | 7/2000 | Levy et al. | |
| 6,119,166 A | 9/2000 | Bergman et al. | |
| 6,122,628 A | 9/2000 | Castelli et al. | |
| 6,125,384 A | 9/2000 | Brandt et al. | |
| 6,182,129 B1 | 1/2001 | Rowe et al. | |
| 6,182,276 B1 | 1/2001 | Brawn et al. | |
| 6,182,277 B1 | 1/2001 | DeGroot et al. | |
| 6,185,617 B1 | 2/2001 | Housel, III et al. | |
| 6,202,070 B1 | 3/2001 | Nguyen et al. | |
| 6,209,128 B1 | 3/2001 | Gerard et al. | |
| 6,223,343 B1 | 4/2001 | Hopwood et al. | |
| 6,272,536 B1 | 8/2001 | van Hoff et al. | |
| 6,282,568 B1 | 8/2001 | Sondur et al. | |
| 6,311,221 B1 | 10/2001 | Raz et al. | |
| 6,314,451 B1 * | 11/2001 | Landsman et al. | 709/203 |
| 6,324,685 B1 | 11/2001 | Balassanian | |
| 6,327,624 B1 | 12/2001 | Mathewson, II et al. | |
| 6,332,217 B1 | 12/2001 | Hastings | |
| 6,341,314 B1 | 1/2002 | Doganata et al. | |
| 6,353,926 B1 | 3/2002 | Parthesarathy et al. | |
| 6,374,207 B1 | 4/2002 | Li et al. | |
| 6,389,592 B1 | 5/2002 | Ayres et al. | |
| 6,408,342 B1 | 6/2002 | Moore et al. | |
| 6,446,110 B1 | 9/2002 | Lection et al. | |
| 6,453,469 B1 | 9/2002 | Jystad | |
| 6,466,967 B2 * | 10/2002 | Landsman et al. | 709/203 |
| 6,516,338 B1 | 2/2003 | Landsman et al. | |
| 6,536,035 B1 | 3/2003 | Hawkins | |
| 6,557,043 B1 | 4/2003 | Fletcher | |
| 6,571,292 B1 | 5/2003 | Fletcher | |
| 6,571,389 B1 | 5/2003 | Spyker et al. | |
| 6,606,604 B1 * | 8/2003 | Dutta | 705/26.81 |
| 6,636,863 B1 * | 10/2003 | Friesen | 1/1 |
| 6,718,540 B1 | 4/2004 | Azua et al. | |
| 6,757,869 B1 | 6/2004 | Li et al. | |
| 6,775,835 B1 | 8/2004 | Ahmad et al. | |
| 6,779,017 B1 | 8/2004 | Lamberton et al. | |
| 6,862,650 B1 | 3/2005 | Matthews et al. | |
| 6,910,066 B1 * | 6/2005 | Pohl | 709/203 |
| 6,983,315 B1 | 1/2006 | Crutcher | |
| 8,332,489 B2 | 12/2012 | Crutcher | |
| 2001/0037400 A1 | 11/2001 | Raz et al. | |
| 2001/0044850 A1 | 11/2001 | Raz et al. | |
| 2006/0047772 A1 | 3/2006 | Crutcher | |

OTHER PUBLICATIONS

Marimba, [Online]. Retrieved from the Internet: White Paper "Understanding Centralized Management of Server Content and Applications," (Sep. 2000) White Paper "Software Applications as Services" (copyright 1998).

Marimba, [Online]. Retrieved from the Internet: White Paper, "Open Software Description, OSD-Describing Software Packages on the Internet" (copright 1998).

"Aggregate Computation and Management", Red Brick Vista, [Online]. Retrieved from the Internet: (Accessed Oct. 4, 2000).

"Croft Intersession Caching of Downloaded Java Classes", [Online]. Retrieved from the Internet: (Apr. 1, 1998).

"Delivering Windows to the Net White Paper", WinToNet by Menta Software, [Online]. Retrieved from the Internet: (2000).

"First There was Streaming Audio, then Streaming Video. Now get ready for Streaming Software", Stream Theory White paper, [Online]. Retrieved from the Internet: (Accessed Sep. 22, 2000).

"How it Works", Boost Web Optimizer Technology Overview, [Online]. Retrieved from the Internet: (Sep. 27, 2000).

"OSD Describing Software Package on the Internet", Marimba Inc. White paper, [Online]. Retrieved from the Internet: (1998).

"Timbale for Windows Terminal Services", Marimba Promotional document, (2000).

"Web Site Performance is Key to E-Commerce Success", Fireclick, [Online]. Retrieved from the Internet: (Accessed Nov. 1, 2000).

"WRQ Reflection Enter View 2.0 for Java (JDK 1.1) Step safely into the future with technology you can trust", [Online].Retrieved from the Internet: "Downloading the BDK 1.1" (Apr. 1999) "BDK 1.0 License" (copyright 1995-2000) "Javabeans Spcifications for the Java2 Platform".

"WRQ Reflection Enter View 2.0 for Java (JDK 1.1) Step safely into the future with technology you can trust", [Online]. Retrieved from the Internet: Onno Kluyt, "JavaBeans Technology: unlock Bean Context" "The Beanbox" "Example Beans" "JAR filed", Apr. 1999.

Basu, J, et al., "Degrees of Transaction Isolation in SQL Cache: A Predicate-based Client-side Caching System", (May 15, 1996), 22 pgs.

Chen, et al., "Real-Time Video and Audio in the World Wide Web", World Wide Web Journal, (Dec. 1995), 16 pgs.

Glass, G, "A Universal Streaming Service", C++ Report, (Apr. 1996), 10 pgs.

Hoff, V, et al., "The Open Software Description Format (OSD)", [Online]. Retrieved from the Internet: (Aug. 11, 1997), 13 pgs.

Jiang, et al., "Prefetching Links on the WWW", Department of Computer Science University of California, (1997), 7 pgs.

Maheshwari, et al., "Collecting distributed garbage cycle by back tracking", ACM PODC, (1997), 10 pgs.

Price, et al., "Producing reusable object oriented components: a domain and organization specific perspecive", ACM SSR, (May 2001), 10 pgs.

Ravat, et al., "Toward daa warehouse design", ACM CIKM. (Nov. 1999), 8 pgs.

Ritchey, T, "Java!" New Riders Publishing, (1995), 3 pgs.

(56) References Cited

OTHER PUBLICATIONS

Schwartz, M. "Telecommunication Networks: Protocols, Modleing and Analysis", Addison-Wesley Publishing Company, 18 pgs, entered in case Nov. 28, 2012.

Shukla, Amit, et al., "Storage Estimation for Multidimensional Aggregates in the Presence of Hierarchis", VLDB Conference Mumbai (Bombay) (1996), 10 pgs.

Skeen, Dale, "New Forms of Persistent Queries are Necessary to Handle Live Business Data as it Speeds Through a Company", BYTE Magazine. [Online]. Retrieved from the Internet: (Feb. 1998), 1 pg.

Wada, et al., "Object groups and group communication in a distributed object oriented programming", IEEE Database & Expert system applications Proc. 9th int. workshop, (1998), 6 pgs.

* cited by examiner

APPLET EMBEDDED CROSS-PLATFORM CACHING

CROSS-REFERENCES TO RELATED APPLICATIONS

This application is a continuation of U.S. patent application Ser. No. 11/183,738, filed on Jul. 19, 2005, now issued as U.S. Pat. No. 8,332,489, which is a continuation of U.S. patent application Ser. No. 09/484,455, filed on Jan. 18, 2000, now issued as U.S. Pat. No. 6,983,315, all of which are incorporated herein by reference in their entireties

FIELD

This technology herein relates to method and apparatus for efficiently caching applets on a client computer.

BACKGROUND AND SUMMARY

It used to be that code to be executed on a personal computer or a workstation was usually supplied by physically inserting a diskette, optical disk or other storage medium into a local drive associated with the personal computer or workstation. Now, such code can simply be downloaded over a computer network. One of the more significant developments in network-based software downloading over the last few years has been the development of Java applets and the Java virtual machine—which allow programs to be dynamically downloaded for execution on an as-needed basis.

Briefly, an applet is a small executable code module that normally doesn't have the complete features and user interface of a normal application. The applet runs inside of an application (for example, a standard web browser) within a "virtual machine"—that is, a set of computer resources and instructions that make up a generally standardized environment for applet's execution. Java is the language most commonly associated with applets, and standard web browsers and other applications include Java-based virtual machines to run Java applets.

Such applets provide a convenient mechanism for flexibly providing client-side functionality. They can provide all sorts of functionality on the client side—everything from graphics support to game play to database lookups to security functions and more. Since Java is a general purpose language, virtually any functionality can be expressed in an applet—but, as discussed below, there are some practical limitations.

In general, how much functionality an applet can provide depends on the applet's size. Small applets download quickly and provide adequate response times, but are limited in terms of their functionality. Larger applets can provide broader functionality but take proportionally longer to download, load and start up. At some point, download/load/startup delay becomes a major hindrance to the use of large applets. No one wants to use an application that takes fifteen minutes to load.

Caching has been used for many years to reduce the time required to load code or data. The idea of caching applets on the client computer is not new. Startup time can be drastically reduced by caching the applet on the client machine. The overall time savings is inversely proportional to the web server connection. Assuming the connection between the client and server is the gating factor, the less information transferred from the server to the client, the better. If the applet can be cached locally the first time it is requested, the user only pays the download penalty once. Subsequent startups should be noticeably faster. Furthermore, there are other reasons besides speed performance for persistently caching applets—for example, reducing network traffic associated with repeatedly downloading the same applet on numerous occasions to the same client machine, and the possibility of flexibly generating vendor-independent persistent class libraries Unfortunately, caching an applet in today's web browser environments can be a daunting task. This is at least in part because each of the various web browsers and Java virtual machines protect against rogue applets by imposing security constraints and requirements on applet persistence. Currently, the primary commercially available browsers (e.g., Netscape Communicator and Navigator, and Microsoft's Internet Explorer) and applet execution platforms each implement applet caching in different, proprietary ways. Some do not implement applet caching at all. To minimize the risk that a rogue applet will damage a client computer, web browsers generally deny downloaded applets the ability to persist after the web browser has been shut down. Such security precautions if enforced will prohibit persistent applet caching altogether.

Despite a security philosophy that discourages downloaded applets from persisting, certain available applications provide a limited ability to allow applets to persist. As one example, Marimba Inc.'s CASTANET™ software distribution infrastructure provides a Java application that provides deployment and local caching of both applets and applications. See for example U.S. Pat. No. 5,919,247 to Van Hoff. However, the Van Hoff technique requires a separate application to be loaded to handle applet channels, and the technique is based on a file updating concept requiring a particular series of identifiers and/or indices. The Van Hoff technique is not generally applicable across a wide range of different applet execution platforms, and also suffers from other disadvantages.

In contrast to such a separate-application approach, it would be highly desirable to develop applet caching capabilities that would work across a number of client-side platforms such as standard-web browsers available from Netscape, Microsoft, and others. However, Netscape's Communicator browser, Microsoft's Internet Explorer browser in Windows and Macintosh, and JavaSoft's web browser Plug-In have differing security models and signing mechanisms and differing caching abilities. As a result, deploying applet caching to a given platform requires specific code for that platform (e.g., specific packaging and signing on both Communicator and IE), and is not even available on some platforms (Plug-In, IE w/MRJ on Mac, HotJava, etc.). Even the html is specific to some platforms. For at least these reasons, flexible, persistent platform-independent applet caching has not been realized in the past.

This technology herein solves this problem by distributing a caching mechanism implemented by an applet—providing a mechanism and framework for caching applets in a modular and cross-platform manner. In accordance with one exemplary illustrative non-limiting implementation, art applet incorporates a lightweight caching mechanism into its root set of classes. The remainder of the applet is divided into functional modules that can be subsequently downloaded as needed. The initial applet and caching mechanism are packaged and signed in a package using tools and procedures native to each platform. Each functional module of the applet can be packaged and signed in a generic, platform-independent fashion for verification and loading by any of the various platform-dependent initial applet, packages. In this way, the same functional module portions of the applet (which may comprise the bulk of the applet) are cached and loaded in a platform-independent manner without requiring or relying on any caching mechanism built into the platform.

Since the initial applet package does not seed to contain more than only a small number of classes (e.g., a caching mechanism and a class loader), the initial download is short, and startup time is reduced.

In accordance with another exemplary illustrative non-limiting implementation, a cache manager including a class loader is constructed and initialized during applet initialization. The initial applet package makes successive calls to the cache manager, asking it to load further, platform-independent functional modules. For each load request, the cache manager checks to see if the request has already been satisfied, and if not, loads the set of classes into memory via the cache manager's classloader. If the module has not already been loaded, the local cache is checked first. If the module is found in the cache, a version check is made against the requested version. If the cached version is found to be compatible, the module is loaded from the cache. Otherwise, the module is retrieved from the server, cached, and loaded.

The following is a non-exhaustive listing of further features and advantages provided by an exemplary illustrative non-limiting implementation:

- An applet persistent mechanism that is consistent across many supported platforms.
- Ability to download applets in a piecemeal fashion, with control over the granularity of package size so as to minimize initial download size.
- A mechanism to allow and support incremental changes to applet modules.
- Applet-based deployment and caching—Caching and loading classes and modules on demand based on construction of a class loader within an applet environment in a platform independent manner.
- Cross-platform caching—Providing a platform independent caching mechanism reduces a significant amount of work that the applet developer has to do to deploy to multiple platforms. Because caching is implemented by an applet, it is not necessary to know about or use any particular caching mechanisms on the client's application (which can vary from one platform to another).
- Modular caching—Breaking an applet up into functional groups, and then fetching them on an as-needed basis, allows the applet to start up quicker by eliminating the download of unseeded classes or other parts of the applet (e.g., fonts, images, sounds, etc.). The applet itself directs what additional modules are needed and when. Additionally, functional groups can be shared by any number of applets. One applet can benefit from another applet having already downloaded a needed group of functional modules.
- Optimized compression and storage of applet modules— Module contents are packaged in an optimal manner for downloading that maximizes the compression algorithms available. By packaging all classes and other components into one stream and compressing only the stream, compression overhead is reduced. As a result, compressed modules are considerably smaller than a compressed standard archive file with the same classes. In contrast with the standard archive (which digitally signs each individual file and stores the resulting digests as a "manifest" file in the archive), we sign the entire stream once—eliminating the need for the manifest file. This reduces overall size and increases "unpacking" efficiency by reducing sign verification overhead.
- A lightweight, wrapping applet that implements the caching mechanism can be used to launch other applets without their needing to implement cache manager. The wrapped applet can be packaged, signed, and used for deploying and caching an applet on a number of platforms without need for packaging or signing anything for each specific platform.
- Applications can be broken up into functional modules that may be versioned and distributed separately.
- Communication between the main applet classes and the functional modules is rooted through a communication service that is downloaded with the main applet.

BRIEF DESCRIPTION OF THE DRAWINGS

These and other features and advantages will be better and more completely understood by referring to the following detailed description of exemplary non-limiting illustrative implementations in conjunction with the drawings, of which.

DETAILED DESCRIPTION

Figure 1:
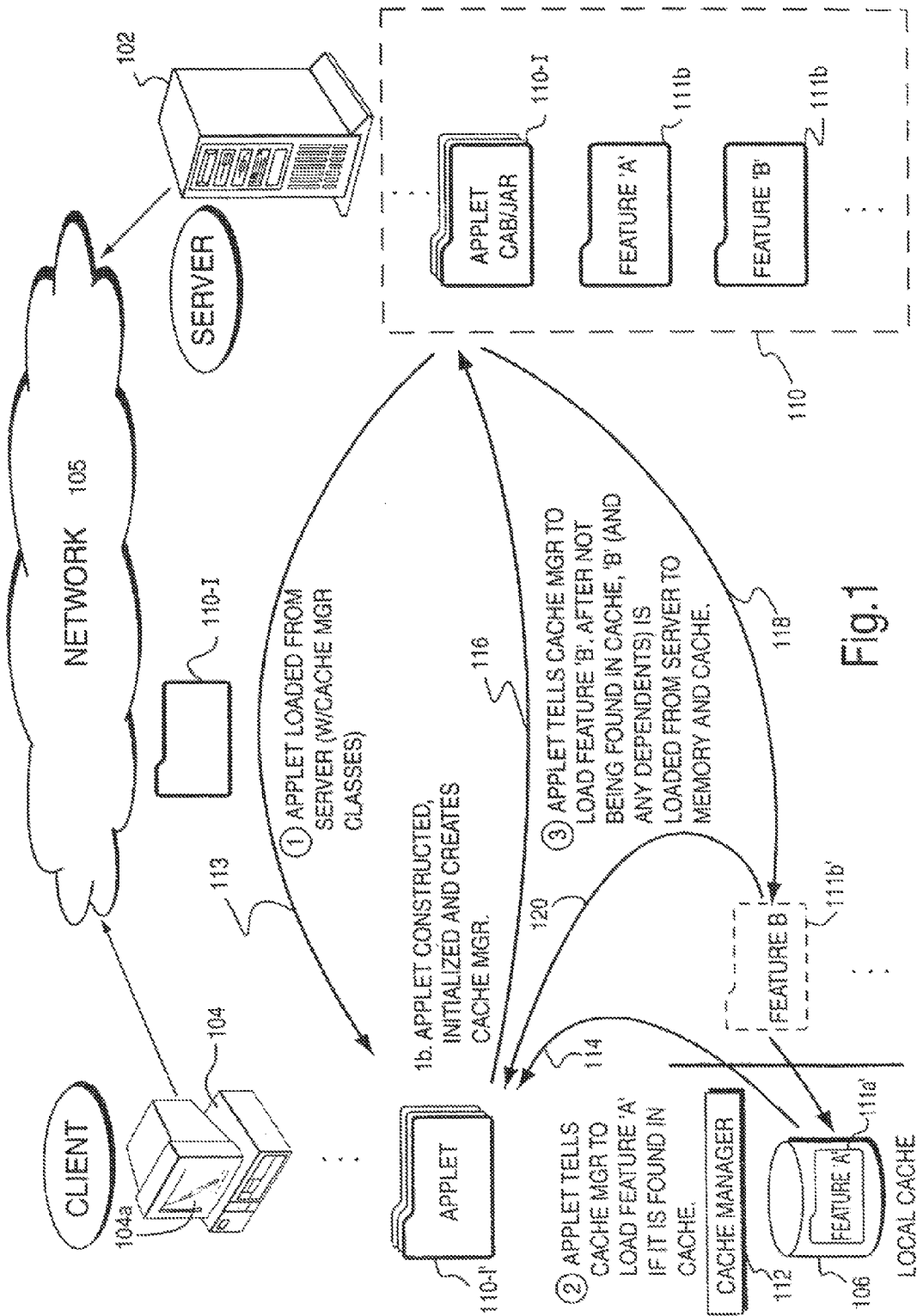
FIG. 1 schematically illustrates an overall applet caching technique provided by an exemplary non-limiting illustrative implementation.

FIG. 1 shows an example persistent applet caching system provided in accordance with an exemplary non-limiting illustrative implementation. The FIG. 1 system 100 includes a server 102 and more or more clients 104. In this example, server 102 may be a conventional web server computer including a processor, local disk storage and an interconnection to the Internet, an Intranet or other computer and/or digital communications network 105. Client 104 may include a conventional personal computer, workstation or other computing appliance including a local hard disk or other non-volatile store 106, a display 104a, a local processor and an interconnection to network 105.

Server 102 and client 104 can communication together over the network 105. In one example, server 102 comprises a web server that supplies web pages and other information, and client 104 comprises a personal computer equipped with a standard web browser such as Netscape Navigator or Communicator or Microsoft Internet Explorer, which browser has (or is extended by a plug-in to have) a so-called Java virtual machine. The client 104's web browser requests web pages from web server 102 over network 105 and displays them on a display 104a. Server 102 can also download applets to client 104 over the network 105 for execution by a virtual machine provided by client 104. Such virtual machine can be, for example, a conventional Java Virtual Machine that is now standard in most web browsers in wide use today.

In the exemplary non-limiting illustrative implementation, applet 110 includes an initial applet package 110-I and one or more additional functional modules 111a, 111b, . . . . Initial applet package 110-I incorporates a light weight caching mechanism in its root set of classes. In the exemplary non-limiting illustrative implementation, initial applet package 110-I (including this persistent caching mechanism) is packaged and signed using tools and procedures native to the particular platform (e.g., web browser) existing on client 104. The exemplary non-limiting illustrative implementation thus provides different "flavors" of initial applet package 110-I for different platforms, for example:

Microsoft IE 4/5 for Windows (using native VM)
Microsoft IE for Mac (using MRJ)
Netscape Communicator 4.06+ for Windows (using native VM)
JavaSoft's Plug-In 1.1.2+
JavaSoft's AppletViewer
Others The different initial applet package 110-I "flavors" or versions may, in one exemplary illustrative non-limiting implementation, be functionally identical (and may in fact be written in the same language such as Java and some of the same code)—but differ in that they are customized for the specific security, signing, packaging (and any other) requirements the various different platforms require to verify, load and run the applet. The initial applet packages 110-I are thus customized by request and obtain the privileges to perform class loading and caching from the particular platform they are written for. Such requirements are well known, and are widely available from Microsoft, Netscape, JavaSoft and others who develop virtual machines that can run applets.

In the exemplary non-limiting illustrative implementation, server 102 determines which of these "flavors" of initial applet package 110-I to download to client 104 in a conventional fashion by identifying the particular application being run at the client. Server 102 may determine which platform is running on client 104 so it can download the initial applet package 110-I that is appropriate to that platform. For example, the HTML may/can contain enough information to direct the client 104's browser to the correct set of classes (e.g., Microsoft Internet Explorer will favor CAB files over JAR files when given the choice); or server 102 can send an http command to the client's web browser requesting identification of the client application by name, version number, etc. Server 102 then downloads the particular "flavor" of initial applet package 110-I that will meet the security and other requirements of client computer 104's associated browser or other applet execution platform.

Once initial applet package 110-I is downloaded, loaded and is running on client computer 104 (the executing version of this applet module is referenced by numeral 110-I'), it constructs, initializes and creates a cache manager 112 including a class loader on the client computer. The executing applet module 110-I' then makes successive calls to the cache manager 112, asking it to retrieve and load further applet functional modules 111 as they are needed. Executing module 110-I' includes a map table or other mechanism that maps commands or other service requests into requests to retrieve and load functional modules 111 capable of performing the requested service(s).

As mentioned above, the remaining classes of applet 110 are divided into functional modules (e.g., "feature A" module 111a, "feature B" module 111b, etc.) that can be platform-independent. In the exemplary non-limiting illustrative implementation, each functional module 111a, 111b, etc., consists of a set of classes and/or other data that are packaged and signed in a way to permit it to be verified and loaded by any of the various "flavors" of initial applet package 110-I. In the exemplary non-limiting illustrative implementation, these functional modules 111 are platform-independent in the sense that any initial applet package 110-I' (irrespective of platform) will be able to accept, verify and load them. Depending on the particular requirements, most of the functionality (and thus the length) of applet 110 may be placed within functional modules 111—minimizing the download time and complexity of initial applet package 110. The division of applet 110 into different functional modules may be based on functions or services to be performed, the complexity of each of the various functions, etc. If desired, functional modules 111 for other needed services can be reused by sharing them between different applets 110.

Modules 111 may depend on other modules 111 in order to operate. For example, classes in one module 111 may need classes in another module 111 in order to load. To provide for such module dependency, the exemplary non-limiting illustrative implementation conveys dependency information within the module 111. The module loader, while trying to load a module 111, will extract the list, and ensure that all listed modules (and their respective versions) are already loaded. If a needed module 111 is not already loaded, loading of the current module is put on hold until the required module is loaded. This process is recursive, to provide for loading dependent modules of dependent modules of dependent modules (ad infinitum).

Determining which functional modules 111 to load and when, can be based on static information and/or dynamic events, such as:

Module list embedded/loaded with initial applet
User input event
System event
Server event
Server-generated html (the applet tag contains additional modules to load based on current context).

Figure 2:
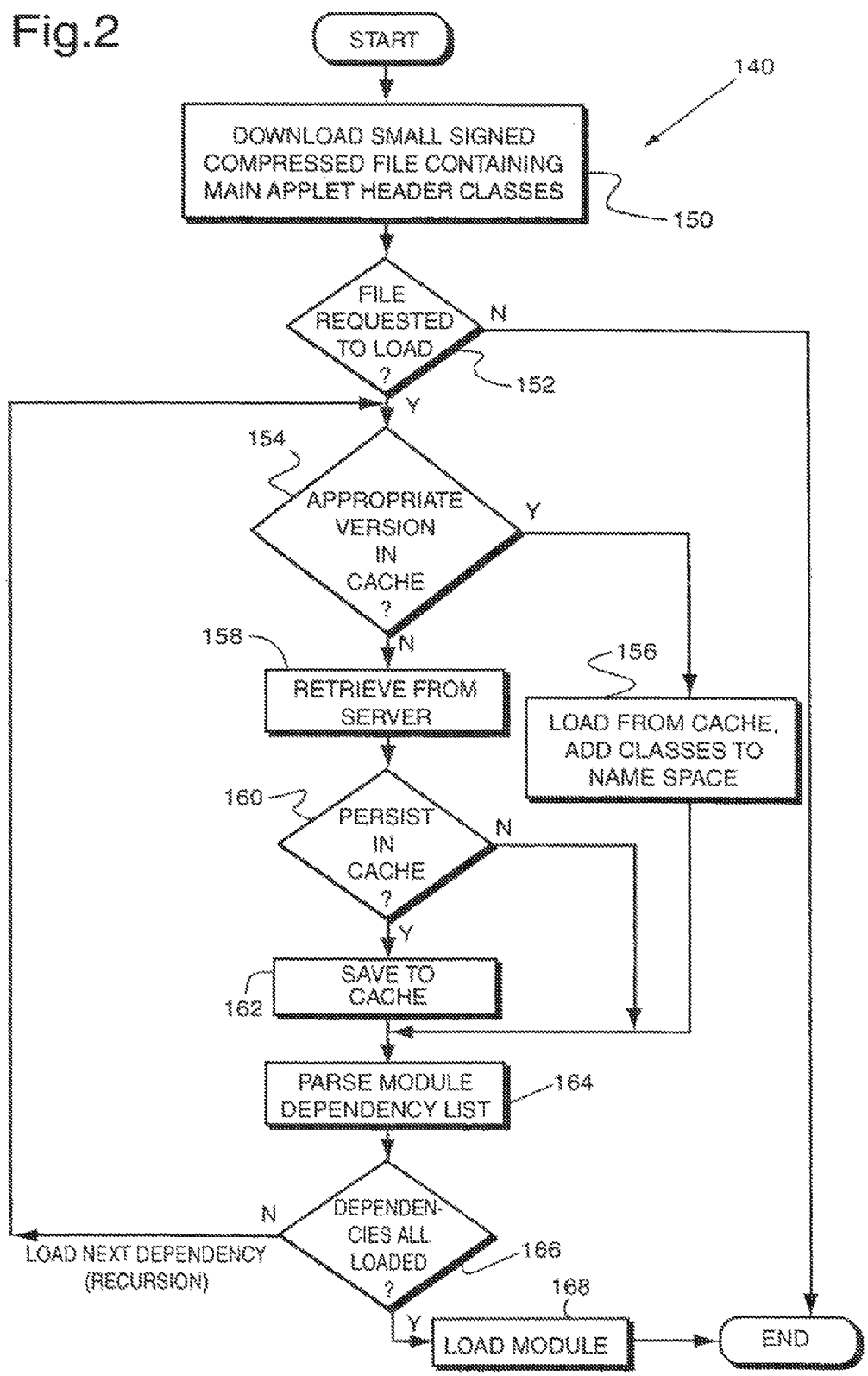
FIG. 2 is a flowchart of exemplary computer-controlled steps.

FIG. 2 shows a flowchart of overall program control steps of a process 140 performed by the system 100 shown in FIG. 1. In this example, initial applet package 110-I is stored on server 102 as a small signed compressed file (e.g., a Microsoft "cabinet" (.cab) file or a Java ARchive (JAR) file). As will be understood by those skilled in the art, the .cab and JAR file formats are conventional, standardized file compression formats that allow many individual files to be stored and downloaded together in compressed format within a single HTTP transaction to a browser or other applet execution platform.

In this example, the small, digitally signed compressed file comprising initial applet package 110-I contains the main applet and loader classes—including a caching mechanism used to subsequently load additional functional modules such as "feature A" module 111a, "feature B" module 111b, etc. In the exemplary non-limiting illustrative implementation, the functional modules 111 are subsequently loaded on an as-needed basis.

The initial applet package 110-I downloaded from server 102 to client 104 over network 105 (block 150; FIG. 2 path 113), and is authenticated, decompressed and executed by a standard web browser or other applet execution platform on client computer 104. Once applet 110-I is running (thus establishing cache manager 112), it may request loading of other compressed archive files (i.e., additional applet class and/or resource files) comprising functional modules 111a, 111b, etc. (decision block 152). For each load request, the cache manager 112 checks to see if the request has already been satisfied. If not, the cache manager 112 attempts to load a set of classes or resources (e.g., images, fonts, etc.) into memory via the cache manager's class loader, and the local cache 106 is checked to see if the functional module 111 to be loaded is already present in the cache (decision block 154). The decision block is downloaded with the applet and can, therefore, be tailored to suit individual application requirements that could change for a given application across time.

If the module has not already been loaded and the module is found in the cache 106, a version check is made against the requested version (decision block 154). If local cache 106 contains an appropriate version of the functional module 111 ("yes" exit to decision block 154), the functional module 111 is loaded from the cache and all of it classes are added to the class loader's namespace (FIG. 2 block 156; FIG. 1 path 114).

If the functional module 111 is not found in cache 106 or the cached version is old ("no" exit to decision block 154), the functional module 111 is retrieved from server 102 over network 105 (FIG. 2 block 158; FIG. 1 path 118). The retrieved functional module 111 may, or may not, be persisted in cache 106 dependent upon how the load call is made. In some eases, the functional module 111 retrieved from server 102 is stored to cache 106 and then loaded via the cache manager ("yes" exit to decision block 160; block 162). In other cases, the retrieved functional module 111 is not locally cached ("no" exit to decision block 160), and is simply loaded. If the retrieved functional module 111 has a dependency list, all dependent functional modules 111 are loaded prior to loading the requested functional module(s) (blocks 164, 166). In the exemplary non-limiting illustrative implementation, recursion is used to load dependent functional modules 111 (i.e., flow returns to block 152) to accommodate arbitrary dependency nesting.

To protect against tampering, all functional modules 111 downloaded from server 102 in the exemplary non-limiting illustrative implementation are digitally signed. The digital signature is verified at download time. Once functional module 111 has made it into cache 106 of client 104, it will be considered trusted. Trusting the contents of cache 106 is no less secure than existing implementations on commonly available web browsers such as Internet Explorer and Netscape.

Figure 3:
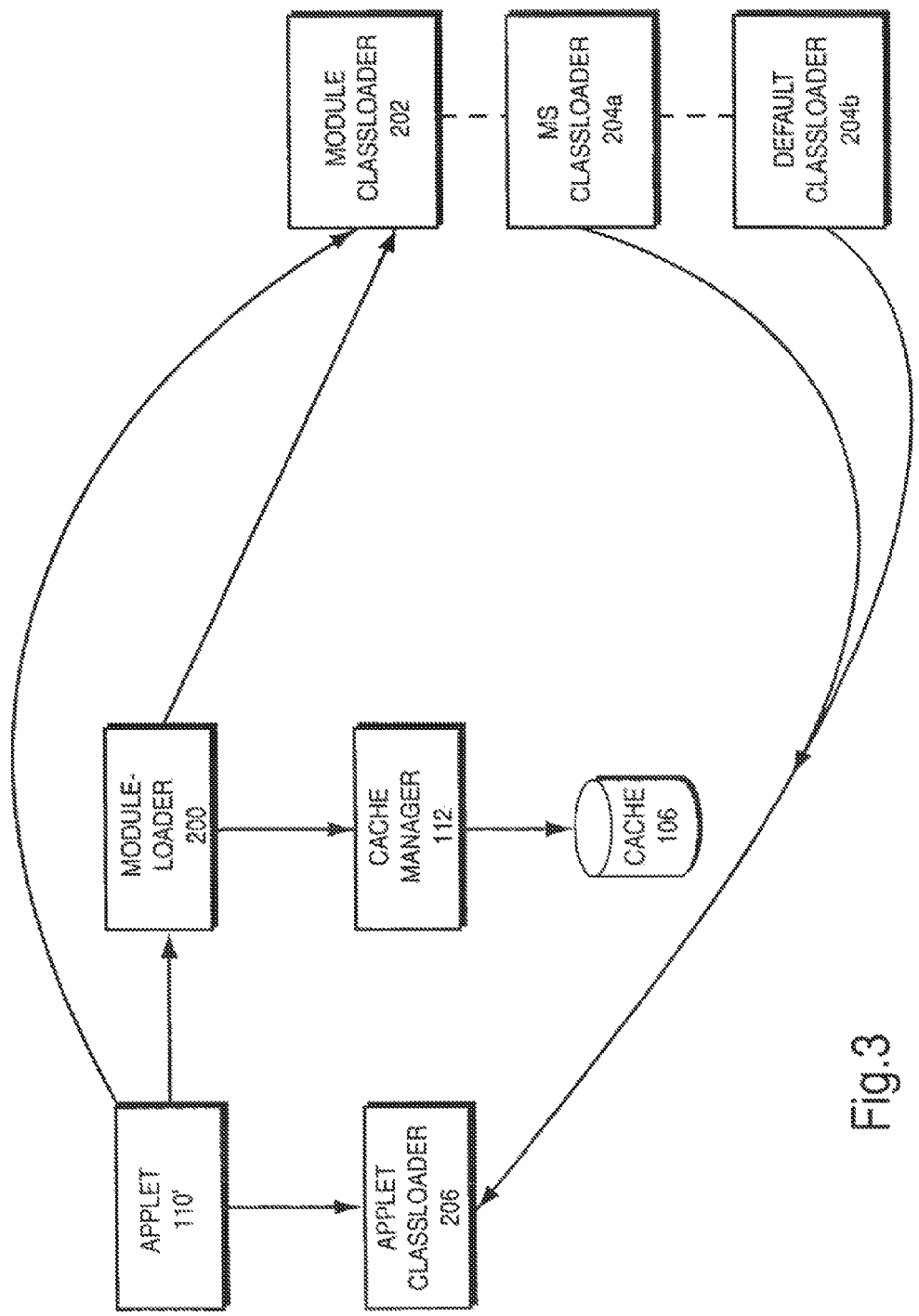
FIG. 3 schematically illustrates example class loader and persistent caching architecture.

FIG. 3 shows an example basic structure and component communication for portions of system 100 existing on client 104 once initial applet package 110-I' has been loaded and is running. In this example, cache manager 112 communicates with and manages non-volatile cache 106. Cache manager 112, in turn, accepts commands from a module loader 200. Module loader (200) creates and manages a platform specific classloader via the module classloader (202). This platform, specific classloader 202 manages volatile (in-memory) cache of the module classes and resources.

In the exemplary non-limiting illustrative implementation, the applet 110 talks to module loader 200 to load modules and retrieve the specific instance of the classloader that should be used. In the exemplary non-limiting illustrative implementation, the classloader 202 derives from the system class, java.lang.Classloader. The applet 110 uses module classloader 202 directly or indirectly to load classes from modules managed by module loader 200. The module classloader 202 can and will retrieve classes and resources from both the applet and the primordial classloader.

Module loader 200 is thus directed by applet 110 to load modules 111 via cache manager 112 and/or module class loader 202. Module class loader 202 (which may include a variety of different conventional class loaders, e.g., an MS class loader 204*a*, a default class loader 204*b*, etc, existing as part of a conventional web browser or other applet execution platform) is also present, and acts to connect one or more classes together into an executable. In this example, these various class loaders 204 can communicate (while observing appropriate namespace restrictions—see below) with applet class loader 206 to load additional classes for execution.

In finding a class, the exemplary non-limiting illustrative implementation module loader 200 first checks to see if the class has already been loaded into memory but has not yet been resolved. If the class has not yet been loaded by module classloader 202, then module loader 200 determines whether the primordial class loader has the class. If the class has not yet been loaded, module loader 200 checks whether the class has been downloaded but not yet loaded. Optionally module loader 200 can also check whether the class is in an applet-supplied URL (a module loader classpath of sorts). Module loader 200 may also check whether the parent classloader has the class. In other words, the search order can be as follows to provide enhanced efficiency and security;

1. Is class already loaded?
2. Does primordial classloader have the class?
3. Do we have the class, but haven't loaded it?
4. (optional) Is it in the applet supplied URL? (a module loader classpath of sorts)
5. Does the parent classloader (normally the applet class loader 206) have the class?
6. Forget it, we give up.

Note that this load order places priority on classes in the module loader 200*b* immediate name space. Therefore, if the class is present in both the parent name space and the module loader 200's name space, the module loader 200's version will be returned.

Figure 4:
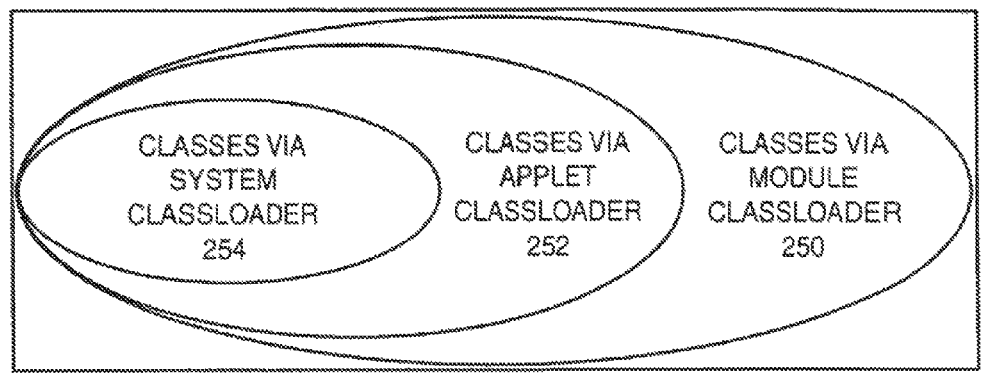
FIG. 4 schematically illustrates the relationship between different types of classes in the exemplary non-limiting illustrative implementation.

FIG. 4 shows that the module class loader 202's name space 250 is a superset of the name space 252 of applet class loader 206—which in turn is a superset of the name space 254 of system class loader 202. The FIG. 4 diagram implies communication boundaries for cross-class communication. In order for two objects, each loaded from a different-class loader, to communicate with each other, the class used for communication, must be accessible to both objects. Therefore, the class must be loaded via a class loader whose name space exists for both objects.

As discussed above, the module loader 200 makes a version test on every functional module 111 it reads from cache 106. Module loader 200 also tests version compatibility of functional modules 111 the first time they are downloaded from server 102. In one specific example, archive (JAR) version numbers may be represented as strings or 32-bit integers using the following format:

| Format: MMmmttbbb* | |
|---|---|
| MM | Major version number |
| Mm | Minor version number |
| Tt | JAR type *i.e., beta, eval) |
| bbb | Build number |

*each letter represents a digit (0-9)

FIG. 2, decision block 154 (which may be downloaded with the applet and thus tailored to it) is responsible in this example for correct interpretation of the versioning information—which in this example is simply an integer and/or string (but could consist of other types of information in other examples). An example string for "version 1.2 build 345" may be for example, "012000345". When a functional module 111 is saved in cache 106, the version number is appended to the functional module's name to make the new module name.

Figure 5:
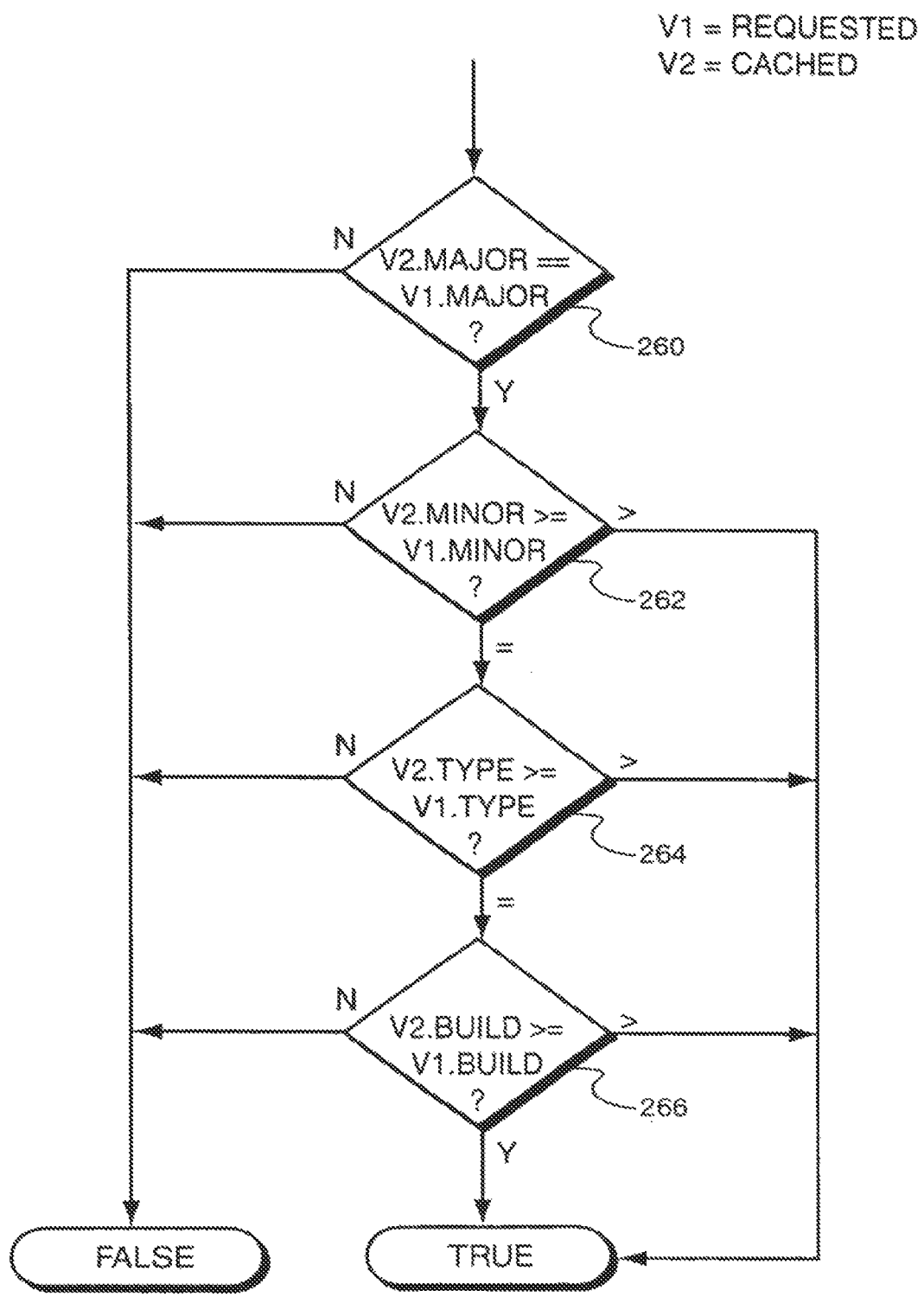
FIG. 5 shows example program controlled logic the exemplary non-limiting illustrative implementation uses to test whether to obtain a functional module from cache or from the server.

When comparing archive version numbers for compatibility, the exemplary non-limiting illustrative implementation can apply, as one example, the particular versioning check shown in FIG. 5 to ensure that the two versions are compatible (i.e., in this ease, that they are interchangeable). Given version number v2 compared against version number v1 for compatibility, v2 is compatible if and only if various tests shown in FIG. 5 all return "true". Thus, for example, the exemplary non-limiting illustrative implementation tests to ensure that the major version number or other identifier match (decision block 260), that the minor version number or other identifier match (decision block 262), that the archive type matches (decision block 264), and that the build number also matches (decision block 266). If all of these tests return "true", then the two functional modules 111 are compatible. If any of the tests return false, then the two functional modules are incompatible and a new version of the functional module 111 should be obtained from server 102. Of course, the FIG. 3 process is just an example; other versioning checking processes (which may be downloaded with applet 110) could be used instead to suit individual application requirements.

Figure 6:
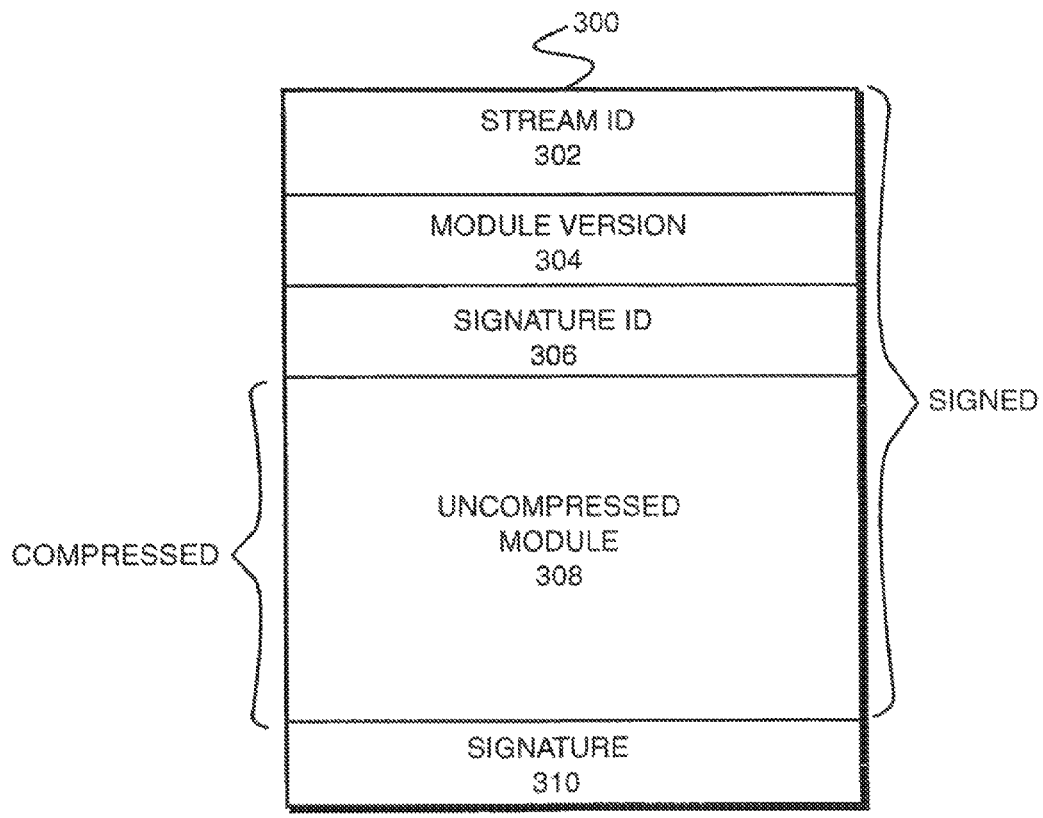
FIG. 6 shows an example compressed data stream.

To optimize download time and functional module 111 processing, the exemplary non-limiting illustrative implementation uses different formats for downloading functional module 111 packages from server 102 as opposed to storing functional modules in local cache 106. An example download format of the exemplary non-limiting illustrative implementation is shown in FIG. 6. This example download format 300 includes:

- a stream ID field 302 (e.g., a 32-bit integer that serves as both a stream identifier and version number);
- a module version field 304 (the version of the functional module 111 contained within die stream—see discussion above);
- a signature ID field 306 (an identifier for the signature used for this stream);
- an uncompressed module field 308 (the actual functional module 111 package to be loaded and persisted—in the exemplary non-limiting illustrative implementation, ail files within the functional module 111 are stored uncompressed); and
- a signature field 310 (the digitally signed digest for this stream 300).

The FIG. 6 format allows for optimal compression of the functional module 111 by compressing the entire functional module 111 instead of individual entries within the functional module 111. This means decompression only needs to happen once, at download; and allows downloaded functional modules 111 to be stored into local cache 106 in uncompressed format. Since functional modules 111 loaded from cache 106 are not compressed, they will load more quickly.

In this example, digital signature 310 applies to the compressed stream and not the uncompressed JAR 308; signing the compressed stream allows verification to proceed more quickly because fewer bytes need to be verified upon download from server 102.

In the exemplary non-limiting illustrative implementation, each downloaded functional module 111 loaded via module loader 200 contains a version file at its root. Module loader 200 uses this file to determine the functional module 111's version and its dependencies. In the exemplary non-limiting illustrative implementation, the syntax of the file name is:

<module name<.<version #>
(ex: ev3270.012000345=ev3270.module version 1.2 build 345)

The actual contents of the file provide functional module 111 dependency information. An example format of this file is:

"dependency_list_version" "<version>"
for each dependent module:
"<module name>", "<version>"

When an functional module 111 is loaded and before returning from the "load Module ( )" call, module loader 200 parses the dependency file and attempts to load all entries.

The exemplary non-limiting illustrative implementation thus provides an applet persistence mechanism that is consistent across many supported platforms; provides for the ability to download applets in a piecemeal fashion with control over the granularity of packet size and while minimizing initial download size; and allows incremental changes to applet modules. Preliminary tests have demonstrated that the technique can work on the most popularly available current web browsers (e.g., Netscape 4.5x, Internet Explorer 4.0/5.0 (later build VMs) on Windows NT/98, as well as MRJ and the Java Plug In v2. However, Java 1.1 requires that defining and enforcing security policies is the job of the container and its security manager. If for a particular web browser it is not possible to force the security manager into allowing the exemplary non-limiting illustrative implementation to create a class and assign privileges, then the exemplary non-limiting illustrative implementation will not work with that particular platform. In addition, there is always the possibility that a Java applet container vendor may view this technique as a security risk, and tighten the reins on the security manager. However, in JDK2, this risk becomes a non-issue since the security policies allow for the creation of a class loader and applets. In Netscape products, however, creating a class loader is prohibited—and trying to create one without explicit permission leads to a security exception. The work around seems to be to enable (programmatically) an undocumented security target. This target is currently being used by Netscape to implement Marimba channels in Marimba's NetCaster product, and is thus likely to exist for some time.

While the invention has been described in connection with what is presently considered to be the most practical and preferred implementations, it is to be understood that the invention is not to be limited to the disclosed implementations, but on the contrary, is intended to cover various modifications and equivalent arrangements included within the scope of the appended claims.

What is claimed is:

1. A set of executable instructions residing in a non-transitory computer-readable medium for execution on a processor, comprising:
   downloading an applet to a browser; and
   executing the applet to create an applet-controlled cache in memory that is independent of an existing browser cache for the browser and that does not require and does not rely on any caching mechanism built into a platform that executes the applet.

2. The medium of claim 1 further comprising instructions for managing the applet-controlled cache via the applet.

3. The medium of claim 1 further comprising instructions for downloading on demand other applets when the other applets are not available already from the applet-controlled cache.

4. The medium of claim 3, wherein downloading on demand further includes checking the applet-controlled cache for the other applets before acquiring the other applets in accordance with requests of the applet.

5. The medium of claim 1, wherein downloading further includes verifying a signature for the applet before executing the applet.

6. The medium of claim 1, wherein downloading further includes identifying a plurality of applet classes in the applet with a root class identified for creating the applet-controlled cache.

7. The medium of claim 6, wherein identifying further includes identifying one or more second classes in the applet classes that stream remaining classes of the applet classes from a remote server to the applet-controlled cache.

8. The medium of claim 1, wherein executing further includes establishing the applet-controlled cache as a platform-independent cache that is independent of a platform associated with the browser.

9. The medium of claim 1, wherein executing further includes acquiring by the applet other applets needed for managing the applet-controlled cache on an as-needed basis.

10. The medium of claim 1, wherein acquiring further includes maintaining by the applet at least some of the applets in a compressed format until specifically requested for managing the applet-controlled cache.

11. A set of executable instructions residing in a non-transitory computer-readable medium for execution on a processor, comprising:
   customizing an applet for a client platform as a package; and
   delivering the package to a browser of the client platform for self-loading and execution within the browser, the applet establishing an independent applet-cache separate from other browser cache within the browser and independent of the client platform and any caching available from that client platform.

12. The medium of claim 11, wherein customizing further includes customizing security for the client platform within the package.

13. The medium of claim 11, wherein customizing further includes configuring the applet to populate, manage, and build the applet-cache on demand within the browser.

14. The medium of claim 13, wherein configuring further includes separating applet classes within the applet for modular management and execution on the browser.

15. The medium of claim 13, wherein configuring further includes configuring the applet to first check the applet-cache for a particular applet or particular applet class before requesting that particular applet of that particular applet class.

16. The medium of claim 15, wherein providing further includes streaming one or more of the different applets to the applet-cache in a compressed format.

17. The medium of claim 11 further comprising instructions for providing different applets on demand to the applet-cache on demand and as requested by the applet as it executes within the browser.

18. A system, comprising:
   a memory having an applet cache that is independent of a browser cache of a browser and independent of a platform that executes an applet that creates and manages the applet cache; and
   a processor coupled to the memory and having the applet that executes on the processor from the memory;
   wherein the applet is configured to create and manage the applet cache and dynamically download and manage other applets as requested and on demand into the applet cache for access by the browser.

19. The system of claim 18, wherein the applet is further configured to maintain or acquire some of the other applets in a compressed format.

20. The system of claim 18, wherein the applet is further configured to check the applet cache for a particular applet before dynamically downloading that particular applet from a remote server.

* * * * *

UNITED STATES PATENT AND TRADEMARK OFFICE
CERTIFICATE OF CORRECTION

PATENT NO.       : 8,918,487 B2                           Page 1 of 1
APPLICATION NO.  : 13/687787
DATED            : December 23, 2014
INVENTOR(S)      : Craig Crutcher It is certified that error appears in the above-identified patent and that said Letters Patent is hereby corrected as shown below:

On the Title Page, Item (57), in "Abstract", in column 2, line 5, delete "seeded." and insert
-- needed. --, therefor Signed and Sealed this
Twenty-eighth Day of April, 2015

Michelle K. Lee
*Director of the United States Patent and Trademark Office*